Feb. 25, 1969 H. A. SEGAL 3,429,369
PLATTER COVER

Filed March 14, 1967 Sheet 1 of 2

INVENTOR
HERBERT A. SEGAL

BY *Segal & Gouda*

ATTORNEYS.

Feb. 25, 1969  H. A. SEGAL  3,429,369
PLATTER COVER

Filed March 14, 1967  Sheet 2 of 2

INVENTOR
HERBERT A. SEGAL
BY Seidel & Gonda
ATTORNEYS.

United States Patent Office 3,429,369
Patented Feb. 25, 1969

3,429,369
PLATTER COVER
Herbert A. Segal, Philadelphia, Pa., assignor to Samson Plastics, Inc., Cherry Hill, N.J., a corporation of New Jersey
Filed Mar. 14, 1967, Ser. No. 622,951
U.S. Cl. 165—47  3 Claims
Int. Cl. F24h 7/06

ABSTRACT OF THE DISCLOSURE

A platter cover having spaced inner and outer walls defining a chamber for receiving heated liquids to maintain the temperature of food on a covered platter.

---

This invention relates to a platter cover. More particularly, this invention relates to an improved platter cover with means to contain a heated liquid for maintaining the temperature of the covered food.

In restaurants, hotels, hospitals, nursing homes and the like, it is important to provide means whereby food can be served while it is still hot. This is particularly important in institutions such as hospitals and nursing homes where the food is prepared in a central kitchen which may be a substantial distance from the patient's room. The problem has long been recognized, and many attempts have been made to solve it. For example, expensive and complicated serving carts have been designed with heating devices so that the food can be transported to the patient's room while still hot.

The most conventional type of heat retaining device is a platter cover, or dish cover as it is sometimes called. Such devices are normally frustro-conical shaped covers which simply overlie the dish or platter. These devices ordinarily have a centrally positioned aperture which serves as a handle or gripping means by which the device can be readily removed. Its drawback, however, is that it allows heat to readily escape from the food. While such prior art dish covers were effective to a certain degree, they are certainly far from being perfect. Thus, the necessity for providing the aforementioned specially designed carts.

The present invention is an improvement upon the prior art platter covers. In accordance with the present invention, the platter covers have an inner and outer wall which define a receiving chamber for hot liquids, such as water. The hot water acts as a radiant heater for the food. Moreover, the double wall thickness together with the water improves the heat insulation qualities of the platter cover.

It therefore is a general object of the present invention to provide an improved platter cover.

It is another object of the present invention to provide an improved heat insulating platter cover.

It is still another object of the present invention to provide a platter cover having heat radiating properties.

Other objects will appear hereinafter.

For the purpose of illustrating the invention, there are shown in the drawings forms which are presently preferred; it being understood, however, that this invention is not limited to the precise arrangements, and instrumentalities shown.

Referring now to the drawings in detail, wherein like numerals indicate like elements, there is shown in FIGURE 1 a perspective view of a platter in accordance with the present invention designated generally as 10.

Figure 1:
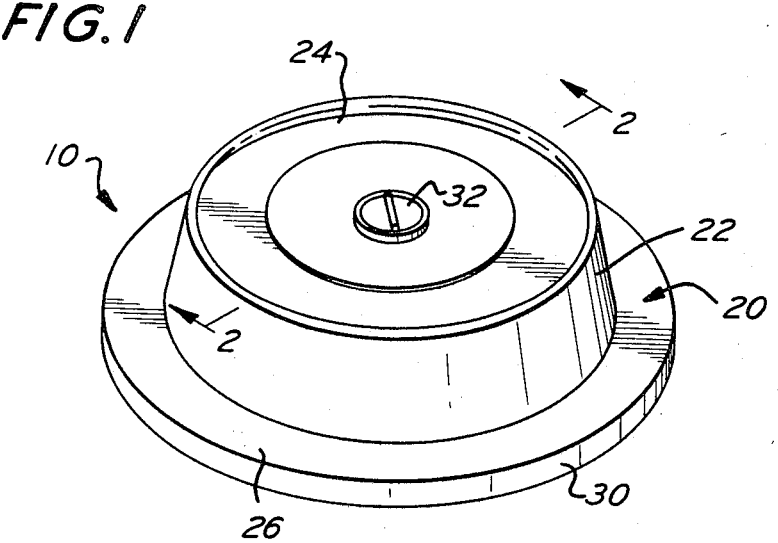
FIGURE 1 is a perspective view of a platter cover in accordance with the present invention.
Figure 2:
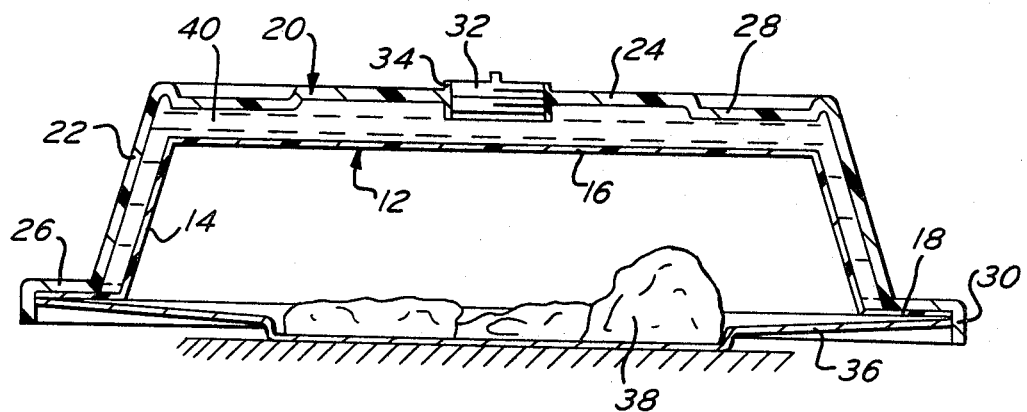
FIGURE 2 is a sectional view of the platter cover illustrated in FIGURE 1 taken along the line 2—2.

Platter cover 10 includes a generally concave inner wall 12 which for purposes of illustration comprises a frustro-conical side wall 14, a generally planar top wall 16, and a laterally extending flange 18, all integrally joined. The platter cover 10 further includes a generally concave outer wall 20 which overlies and is joined to the inner wall 12. Wall 20 is illustrated as comprising a frustro-conical side wall 22 which is integrally joined to a generally planar top wall 24 and to a laterally extending flange 26. In the embodiment shown, the top wall 24 includes a circular recess 28, but such recess is not necessary to the invention. A lip 30 depends downwardly from the outer edge of flange 26.

As shown, outer wall 20 overlies and is spaced away from inner wall 12. The two walls are joined together by abutting their flanges 18 and 26. In the preferred embodiment, the platter cover 10 is a plastic material which is capable of withstanding high temperatures. Accordingly, the flanges 18 and 26 can be joined in fluid type sealing relation by means of a cement, such as an epoxy. As thus joined, the inner wall 12 and outer wall 20 define between them a fluid chamber into which a hot liquid, such as hot water, can be introduced. This is accomplished by removing the plug 32 which is threadedly engaged in an opening in top wall 24. The opening is defined by a flange 34 having threads on the inner periphery thereof. If desired, the plug 32 and opening as defined by flange 34 can be mounted in the inner wall 12.

If desired, the platter 10 could be made of metal, such as stainless steel, rather than plastic. In either case, the material should be of the type that would withstand the high temperature of sterilization as well as the high temperatures of the liquid introduced through the opening defined by flange 34. In the preferred embodiment, the outer wall 20 is made of a relatively thick material and is relatively non-conductive of heat. The inner wall 12 is relatively thin and made of a heat conducting material. Plastics or metals which meet these standards are readily available in the open market. In general, it is intended that the structure be such that heat is radiated inwardly toward the food.

In use, the platter cover 10 is filled with hot water. The water temperatures preferably range anywhere from 120° to near boiling. However, water temperature mainly depends upon individual requirements. After filling, the plug 32 is fitted into position. Thereafter, cover 10 is placed over the platter, such as the dish 36. In most institutions, a standard size platter is used. For example, the dish supporting the main course is normally approximately 10 inches in diameter. The lip 30 is therefore made to be just over 10 inches in diameter. Of course, for smaller dishes such as soup bowls, the platter cover 10 is to be made smaller in diameter. As shown, the flange 18 rests on the dish 36 and the lip 30 extends about its periphery. In this manner, the dish is effectively covered by the platter cover 10.

As thus positioned, the heat radiating from the food 38 is sealed within the chamber defined by dish 36 and cover 10. Moreover, heat radiating from the hot water 40 between the inner wall 12 and outer wall 20 will serve to help maintain the temperature of the food 38. In addition, the water 40 acts as an insulator to prevent the escape of heat through the walls 12 and 20.

It should be understood that a preferred embodiment has been described. Other modifications are possible, such as making the chamber for the water 40 smaller by joining the wall 16 to the wall 22, thereby eliminating the necessity for wall 14.

Figure 3:
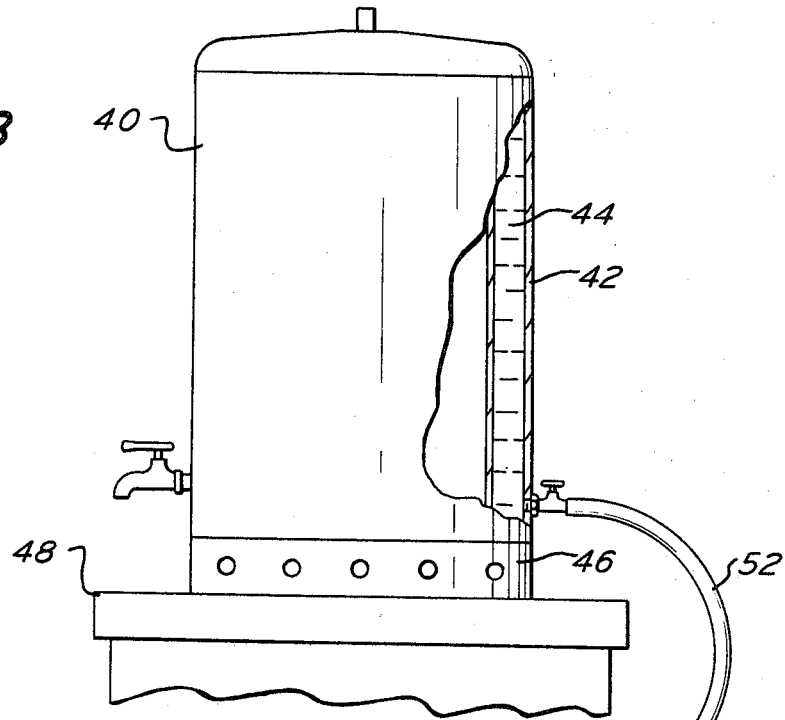
FIGURE 3 is a front view of a hot water source.
Figure 4:
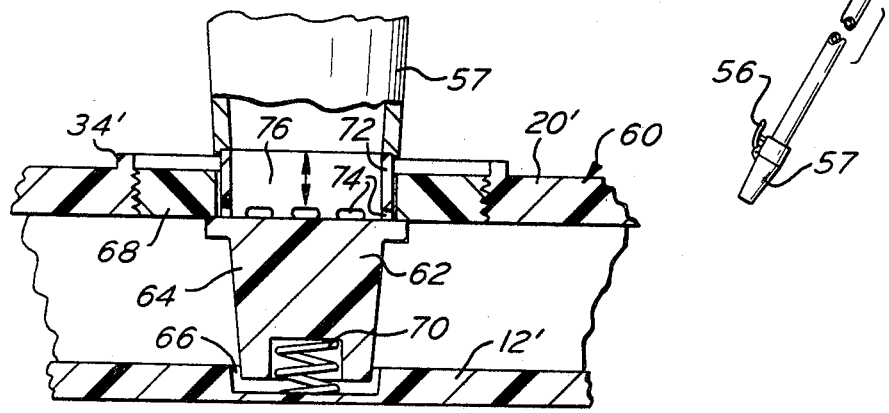
FIGURE 4 is a sectional view of a valve used with the platter cover.

Referring now to FIGURES 3 and 4, there is shown a second embodiment of the present invention. A source of hot water, such as a conventional coffee urn 40 having an outer water jacket 42 within which is kept hot water 44, heated by the gas jets 46, is positioned on a stand 48. A valve 50 is connected to the hot water source within the jacket. Connected to the valve 50 is a hose 52 fitted at its free end with a hand valve 56 and nozzle 57.

In this embodiment of the invention, the platter cover 60 is the same as platter cover 10 with one exception to be set forth below. Accordingly, the elements of platter cover 60 have been assigned the same numerals as the elements of platter cover 10 except a prime has been added.

In accordance with the invention illustrated in FIGURES 3 and 4, a valve 62 has been fitted in the flange 34'. Valve 62 is of the type that opens upon application of the nozzle 57 to permit hot water from the water jacket 42 to flow into the cavity defined by the walls 12' and 20'. It is expected that the pressure head developed within the source of hot water, such as the pressure developed by the urn 40, will be sufficient to force water through the valve 62.

As shown, the valve 62 includes a poppet 64 which reciprocates within a recess 66 in wall 12'. The upper surface of poppet 64 is ground flat and biased upwardly against a valve seat 68 by a spring 70. The valve seat 68 is threadedly positioned in the flange 34. A cylindrical member 72 is fixed to the poppet 64 and protrudes upwardly within an opening 76 in valve seat 68. The diameter of cylinder 72 is equal to the median diameter of the walls of valve 57.

To fill the platter cover 60, an operator need only insert the valve 57 in the openings 76 thereby engaging the cylinder 72 and biasing the poppet toward the wall 12'. This unseats the poppet from valve seat 68 and allows water to flow through holes 74 into the chamber between inner and outer walls 12' and 20'. The flow of water is controlled by hand valve 56. When the nozzle is removed from the opening 76, the poppet 64 is forced back into seating engagement with the valve seat 68 and thereby closes the chamber between walls 12' and 20'. To remove water from the chamber, the poppet can be pressed and held open until the water runs out or the entire valve can be removed by unscrewing seat 68 from flange 34'.

There are several advantages to the embodiment illustrated in FIGURES 3 and 4. The foremost advantage is the rapidity at which the platter 60 can be filled with hot water. Although any source of hot water would do, the coffee urn 40 provides a ready source of hot water which is always available in institutional kitchens.

The present invention may be embodied in other specific forms without departing from the spirit or essential attributes thereof and, accordingly, reference should be made to the appended claims, rather than to the foregoing specification as indicating the scope of the invention.

I claim:

1. A platter cover comprising a generally concave inner wall, a generally concave outer wall overlying and spaced from said inner wall, said walls being generally parallel to one another, each wall having a generally horizontally disposed radially outwardly extending flange at its periphery, said flanges being joined together so as to define a closed fluid chamber between the walls and being adapted to seat on the outer periphery of a platter, said outer wall having an axially extending lip surrounding the flange on said inner wall and extending therebelow to thereby cooperate with said flanges to effectively seal the platter, said inner wall being a better heat conductor than said outer wall, and means removably attached only to said outer wall for introducing a heated liquid into said chamber.

2. A platter cover in accordance with claim 1 wherein said means includes a plug threadedly coupled to said outer wall and a flange on said outer wall.

3. A platter cover in accordance with claim 1 wherein said means includes a valve seat.

References Cited

UNITED STATES PATENTS

| 24,636 | 7/1859 | Smith | 165—73 |
| 3,326,021 | 6/1967 | Latulippe | 67—87 |
| 2,833,906 | 5/1958 | Wingo | 126—261 |

ROBERT A. O'LEARY, *Primary Examiner.*

CHARLES SUKALO, *Assistant Examiner.*

U.S. Cl. X.R.

126—261; 165—73, 186